UNITED STATES PATENT OFFICE.

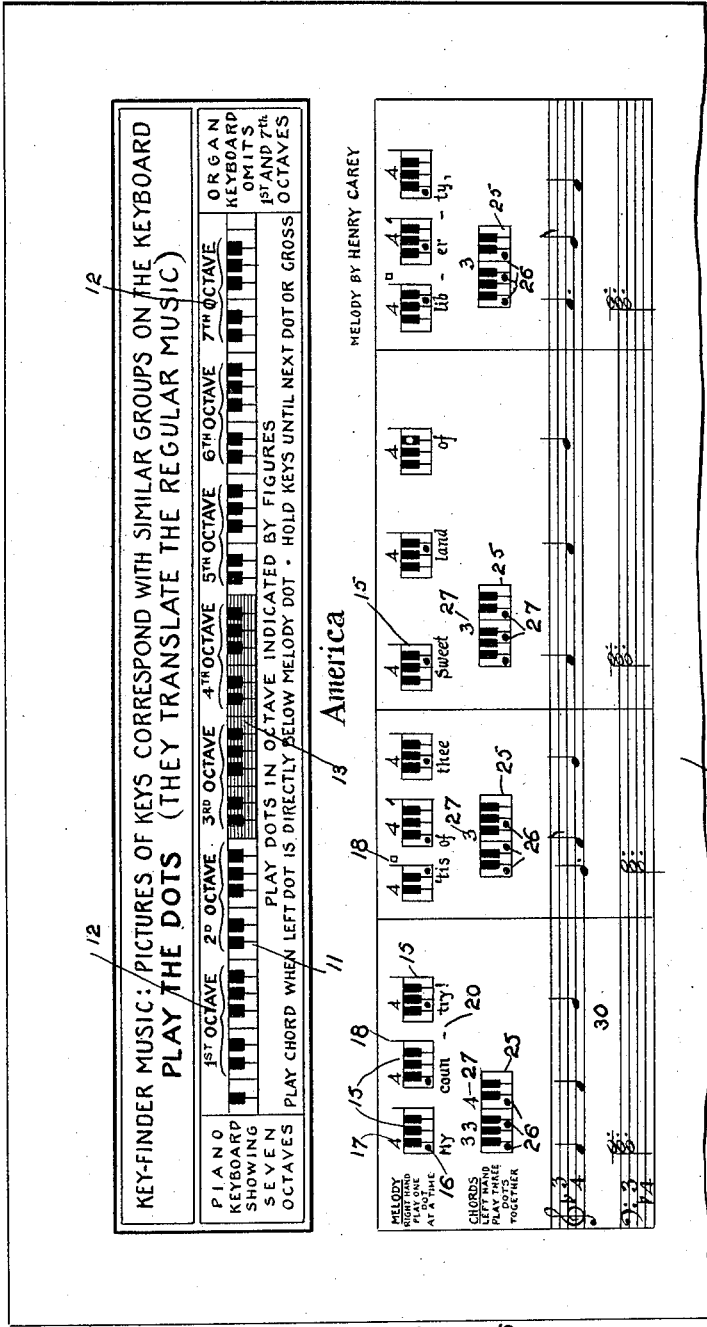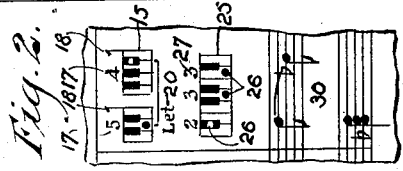

FRANK TAFT, OF MONTCLAIR, NEW JERSEY.

MUSICAL NOTATION.

1,356,416.   Specification of Letters Patent.   Patented Oct. 19, 1920.

Application filed March 13, 1919. Serial No. 282,340.

*To all whom it may concern:*

Be it known that I, FRANK TAFT, a citizen of the United States, and a resident of Montclair, in the county of Essex and State of New Jersey, have invented a new and Improved Musical Notation, of which the following is a full, clear, and exact description.

The invention relates to musical notations such as shown and described in the application for Letters Patent of the United States, No. 240,963, filed by me on June 20, 1918.

The object of the invention is to provide a new and improved musical notation arranged to enable a person unfamiliar with the usual written or printed score of a musical composition to readily located the keys and execute the composition on a piano, organ or other keyboard controlled musical instrument. Another object is to permit of representing notes of lower pitch after notes of higher pitch in the regular order in which they are played without danger of confusing the player.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both views.

Figure 1 is a fragment of a sheet of music printed in accordance with my invention; and Fig. 2 is another fragment of the same.

On the sheet 10 is printed a representation 11 of the keyboard of a piano, organ or similar musical instrument and associated with this representation 11 are indicating means 12 indicating the several octaves of the keyboard. The third and fourth octaves of the keyboard representation 11 are provided with shading or distinguishing lines to visually distinguish the third octave from the second octave and to visually distinguish the fourth octave from the fifth octave. The representation 11 preferably forms the heading of the sheet 10 and this heading is provided with explanatory matter for using the musical notation. The score of a musical composition is printed on the sheet 10 and the melody of the musical composition is represented by spaced representations 15 of portions of the keyboard representation 11, each representation 15 preferably comprising four white keys and three black keys, as shown in Fig. 1; but three white keys and three black keys only may be used, as indicated in Fig. 2. With each representation 15 is associated a given indicating mark 16, preferably in the form of a dot appearing on the particular key to be played. Thus if the dot 16 is on a white key it appears in colors, and if the dot appears on a black key it appears in white as will be understood by reference to the last note in the third bar of Fig. 1 and the last note in Fig. 2. With these representations 15 is associated an octave indicating means 17, preferably in the form of a numeral corresponding to the corresponding octave indicating means 12 associated with the whole keyboard representation 11. It will be noticed that by this arrangement the performer by looking at a representation 15 can readily locate the particular key to be played and the particular octave containing this key. Associated with each representation 15 is a character 18 of usual construction and indicating the time duration of the note to be played. The words 20 of the melody are preferably printed directly below the representations 15 with the syllables in proper relation to the corresponding notes.

The musical notation for the accompaniment consists of representations 25 of the keyboard representation 11 and each of the accompaniment representations 25 preferably embraces seven white keys and five black keys, as shown in Fig. 1, or seven white keys and four black keys, as indicated in Fig. 2. A single accompaniment representation is associated with all the representations of notes of the melody with which a single chord of the accompaniment is played, and sundry of the keys of this representation 25 are provided with key-indicating means 26 in the form of black and white dots similar to the ones above described in reference to the melody. The several marked keys of each keyboard portion 25 represent a chord and indicate to the player that they are to be played simultaneously, and are to be sustained while the several notes of the melody which have their representations associated with said keyboard portion 25 of the accompaniment, are being played. Each key representation 25 has associated therewith coöperative indicating means 27, preferably in the form of numerals, corresponding to the octave indicating means 12 associated with the whole keyboard representation 11. Thus the first chord shown in Fig. 1 discloses three black dots and the numerals 3, 3, 4, thus indicating that keys of the third and fourth octaves have to be played, and the white keys to be played are indicated by the black dots on the corresponding keys. It is understood that the above described system is carried out throughout the sheet of music, with the chords printed in proper relation to the melody and directly below the same so that the performer plays the melody and accompaniment keys in the proper relation.

The ordinary musical notation 30 is preferably printed on the sheet 10 directly below my improved notation but this ordinary notation 30 may be omitted.

When in use the sheet 10 is placed behind the keyboard, and the player may readily locate the third and fourth octaves upon the keyboard from the representation 11 upon the sheet, and from this starting point the player is enabled to quickly locate desired ones of the succeeding higher or lower octaves so that a note will always be played in the proper octave according to the octave indicating means 17 or 27 associated with the representation 15 or 25 for said note.

It is understood that I do not limit myself to the particular notation shown and applied to a melody and accompaniment as the notation can be readily used for other musical scores including accompaniments for the voice or for violins or other musical instruments.

Having thus described my invention, I claim as new and desire to secure by Letters Patent:—

1. A sheet bearing a passage of music represented by a series of spaced pictorial representations of portions of the tone producing instrumentalities to be employed for producing the passage of music, said representations each embracing only such a portion of the tone reproducing instrumentalities contained in a single octave as is necessary to properly identify the instrumentalities represented, key indicating means associated with the said pictorial representations indicating the individual tone producing instrumentalities to be played, and octave indicating means associated with the said pictorial repsesentations indicating the octaves of the tone producing instrumentalities represented by said pictorial representations of portions of the tone producing instrumentalities.

2. A sheet bearing a passage of music represented by a series of spaced pictorial representations for the melody and a series of spaced pictorial representations of the accompaniment, each pictorial representation indicating a division of the keyboard of a musical instrument to be manipulated for producing the passage of music, each representation having associated therewith a key indicating mark indicating the particular key to be played, and octave locating marks associated with the said representation indicating the octaves of the keyboard.

3. A sheet bearing a passage of music represented by spaced pictorial representations of portions of a keyboard of a musical instrument, each representation representing a plurality of keys, a playing mark associated with one of the said keys of each representation indicating the particular key to be played for producing the corresponding note of a melody, the said sheet having printed thereon a representation of a whole keyboard and having associated therewith indicating means indicating the octaves of the keyboard.

4. A sheet bearing a passage of music represented by spaced pictorial representations of portions of a keyboard of a musical instrument, each representation representing a plurality of keys, a series of playing marks associated with each of the said representations, the playing marks of a series indicating the individual keys to be played for producing a chord of the accompaniment, the said sheet having printed thereon a representation of a whole keyboard and having associated therewith indicating means indicating the octaves of the keyboard.

5. A sheet bearing a passage of music represented by spaced pictorial representations of portions of a keyboard of a musical instrument, each representation representing a plurality of keys, a playing mark associated with one of the said keys of each representation indicating the particular key to be played for producing the corresponding note of a melody, the said sheet having printed thereon a representation of a whole keyboard and having associated therewith indicating means indicating the octaves of the keyboard, and a single octave indicating means associated with each of the said representations of portions of the keyboard and corresponding to the corresponding octave indicating means on the said whole keyboard representation.

6. A sheet bearing a passage of music represented by spaced pictorial representations of portions of a keyboard of a musical instrument, each representation representing a plurality of keys, a series of playing marks associated with each of the said representations, the playing marks of a series indicating the individual keys to be played for producing a chord of the accompaniment, the said sheet having printed thereon a representation of a whole keyboard and having associated therewith indicating means indicating the ovtaves of the keyboard, and octave indicating means associated with each of the said representations of portions of the keyboard and corresponding to corresponding octave indicating means on the said whole keyboard representation.

7. A sheet bearing a passage of music represented by a series of spaced pictorial representations of portions of the tone producing instrumentalities to be employed for producing the passage of music, key indicating means associated with the said pictorial representations indicating the individual tone producing instrumentalities to be played, said sheet having thereon a representation of all the tone producing instrumentalities which may be employed, and having associated therewith indicating means indicating the octaves of the tone producing instrumentalities.

8. A sheet bearing a passage of music represented by a series of spaced pictorial representations of portions of the tone producing instrumentalities to be employed for producing the passage of music, key indicating means associated with the said pictorial representations indicating the individual tone producing instrumentalities to be played, said sheet having thereon a representation of all the tone producing instrumentalities which may be employed, and having associated therewith indicating means indicating the octaves of the tone producing instrumentalities, and a single octave indicating means associated with each of the said representations of portions of the tone producing instrumentalities, and corresponding to the corresponding octave indicating means associated with the representation of all the tone producing instrumentalities which may be employed.

9. A sheet bearing a passage of music represented by two series of spaced pictorial representations of portions of the tone producing instrumentalities to be employed for producing the passage of music, one of said series being for the melody and one for the accompaniment, and key indicating means associated with the said pictorial representations indicating the individual tone producing instrumentalities to be played, the representations indicating as many of the individual notes of the melody as are accompanied by a single chord of the accompaniment having associated therewith a single representation of the accompaniment series upon which is indicated all the notes of said chord.

10. A sheet bearing a passage of music represented by two series of spaced pictorial representations of portions of the tone producing instrumentalities to be employed for producing the passage of music, one of said series being for the melody and one for the accompaniment, said representations each embracing only such a portion of the tone reproducing instrumentalities contained in a single octave as is necessary to properly identify the instrumentalities represented, key indicating means associated with the said pictorial representations indicating the individual tone producing instrumentalities to be played, and octave indicating means associated with the said pictorial representations indicating the octaves of the tone producing instrumentalities represented by said pictorial representations of portions of the tone producing instrumentalities, the representations indicating as many of the individual notes of the melody as are accompanied by a single chord of the accompaniment having associated therewith a single representation of the accompaniment series upon which is indicated all the notes of said chord.

FRANK TAFT.